J. A. Wilkinson.
Surface Shears.
No. 25,298. Patented Aug. 30, 1859.

Witnesses:
Peter Van Schaack
Lemuel W. Serrell

Inventor:
Jeptha A. Wilkinson

UNITED STATES PATENT OFFICE.

JEPTHA AVERY WILKINSON, OF BROOKLYN, NEW YORK.

SHEARS FOR SEPARATING PAPER.

Specification of Letters Patent No. 25,298, dated August 30, 1859.

*To all whom it may concern:*

Be it known that I, JEPTHA AVERY WILKINSON, of Brooklyn, in the county of Kings and State of New York, have invented, made, and applied to use certain new and useful Improvements in Shears for Cutting Paper and Similar Substances, which I term "Wilkinsons Surface- Shear;" and I do hereby declare that the following is a full, clear, and exact description of the construction and operation of the same, reference being had to the annexed drawing, making part of this specification wherein—

Figure 1:
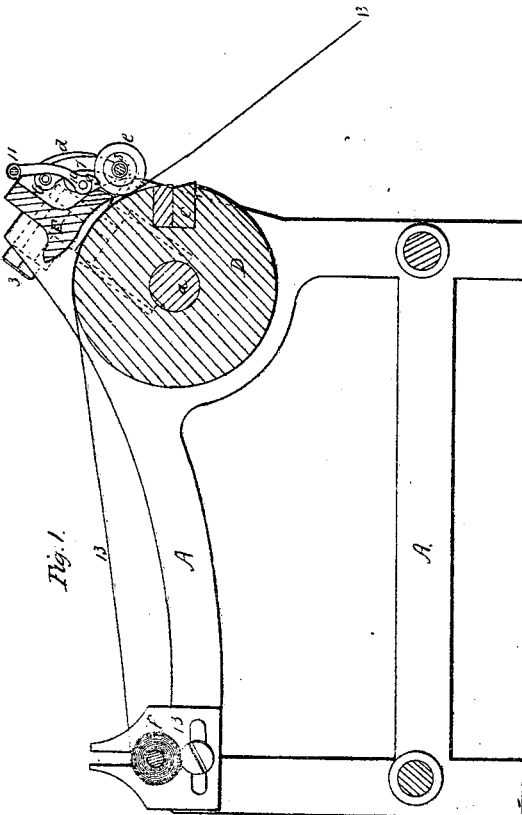
Figure 2:
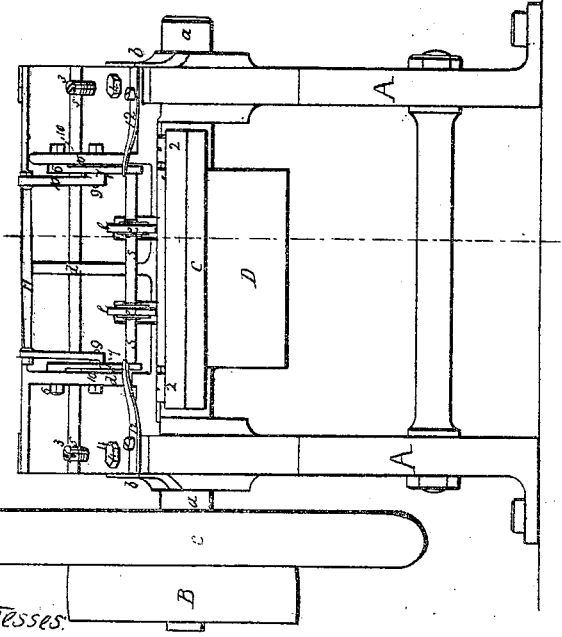
Figure 3:
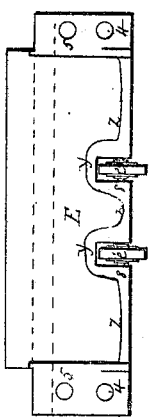
Figure 4:
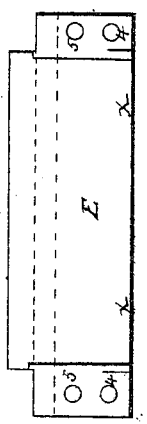

Figure 1, is a vertical section through the revolving shear at the line $l$, $l$, of Fig. 2. Fig. 2 is an end view of said shear; Fig. 3, is an inverted plan showing the interior surface of the fixed shear with the elastic rollers, and Fig. 4, is a similar view without the rollers.

Similar marks of reference denote the same parts.

I make use of a revolving shear or cutter, combined with and acting against a stationary surface, which is so formed as gradually to approach the path described by the edge of the revolving shear until they coincide, so that there is no space left for the paper which is thereby separated in a line corresponding to the shape of the shear. By this means no impediment is offered to the progress of the advancing sheet as is the case with all reciprocating shears and such rotary shears as act against a stationary blade, neither is there any wear or concussion by the metal parts coming into actual contact, because the shear itself revolves in free space, without of necessity, touching the standing shear but revolving so close to the surface thereof that there is not room for any intervening substance which is separated by the fixed surface forcing the paper onto the edge of the knife. In my "rotary printing press" this shear must be straight and so positioned as to cut off the paper between the printed sheets or pages; although said shear might be differently shaped according to the form to be cut out.

On the shaft $a$, (see Fig. 1,) the cylinder D is affixed, carrying the shear $c$, and said cylinder is of a circumference corresponding to the length of each sheet of paper.

E is a head block over the shear cylinder D, fitted so as to be adjusted, having a curved surface next said cylinder, gradually approaching thereto until it coincides with the path described by said shear ($c$), and if that point of coincidence be a straight line as seen at $x$, in the inverted plan of the stationary shear E, Fig. 4, the separation is simultaneous across the whole sheet because the shear $c$, coincides so closely with the fixed surface, that there is no room for the paper, which thereby is punched or cut off. There is therefore no wear on the shear $c$, by coming in contact with metal, and should there be, from inaccuracy of workmanship, the parts wear to each others shape and are so much more accurate and efficient, and the shear having no inequalities to obstruct the paper is more reliable under all circumstances than any other device I know of. I have however found that with high speed, the damp paper is sometimes liable to become clogged between the cylinder D, and standing shear E, on account of there not being a tension on the paper to pull it through. I have therefore obviated this difficulty by making the separation progressively or at two operations, and applying traction rollers as follows.

$e$, $e$, are one two or more rollers which I prefer to be of india rubber each between two metal disks on a shaft 8, the ends of which are held by, and revolve in, links 7, and 12, are springs pressing down these links and the rollers $e$, $e$, onto the cylinder D. These rollers pass through openings or notches in the stationary shear E, and can be raised off of the cylinder, when desired to stop the paper being drawn through or for the purpose of entering the sheet, by means of cam pieces 10, on levers 9, connected by the rod 11. The surface of the shear E, is formed so as to commence cutting the paper against the part $y$, see inverted plan Fig. 3, and as the paper is held against the cylinder D, by the rollers $e$, $e$, and is carried through, the shear $c$, passes beneath said rollers and they hold the advancing edge of the next sheet; during this operation the cutting has been progressing against the diagonal surfaces between $y$ and $z$, and when shear $c$, arrives at the part $z$, of the shear E, the separation is completed across the remaining portion of the cut, thus insuring the correct passage of the paper through between the standing shear and revolving cylinder and cutter, and making the separation progressively or at two successive operations upon the same straight edged shear but upon different parts of the same shear. Where the paper is taken away by a packing apparatus slight filaments of paper may be left to insure the passage of the paper into said apparatus.

The circumference of the cylinder D, becomes the measure of the length of paper, but when the revolving shear is attached by arms instead of the cylinder D, this apparatus may be used to cut off paper or any other fibrous substance at any length according to the speed of the material compared with the revolutions of the shear, as in paper mills &c. The shape of the surface left on the inside of the fixed shear to cause the revolving shear to cut the fibrous substance may be varied, according to the particular purpose required, so long as the rollers e, e, are permitted to act on the advancing sheet before the separation of the previous one is completed.

It will be evident that two or more cutting shears might be attached to the cylinder D, to separate the paper or other substance at the desired points. It will be seen that a very sharp cutting edge is not required, as with ordinary shears, because the parts do not actually require to come in contact, but cut the material off by a compression or nipping operation, as aforesaid, and this shear can be applied to separate any desired substance.

I do not claim a revolving shear or a fixed blade against which the cutting operation is effected, but

What I claim as my invention and desire to secure by Letters Patent is—

1. Separating paper or other material by the joint operation of a revolving shear and a stationary surface, when said stationary surface is so formed and placed as gradually to approach the path described by the shear in its revolution and compress the said paper or other material onto the edge of said revolving shear in the manner and substantially as specified.

2. I claim the elastic roller or rollers e, e, in combination with the stationary shear E, and revolving shear c, on the cylinder D, whereby the paper is passed through and separated progressively or at two operations as set forth.

3. I claim the arrangement of the shaft carrying the rollers e, e, the springs 12, and cams 10, for elevating the rollers and preventing traction on the paper as set forth.

In witness whereof I have hereunto set my signature this tenth day of June 1859.

JEPTHA A. WILKINSON.

Witnesses:
LEMUEL W. SERRELL,
THOS. GEO. HAROLD.